United States Patent
Radhakrishnan et al.

(10) Patent No.: US 8,531,989 B2
(45) Date of Patent: Sep. 10, 2013

(54) SYSTEMS AND METHODS FOR IMPLEMENTING AD HOC WIRELESS NETWORKING

(75) Inventors: Ravi Alagappan Radhakrishnan, Chennai (IN); Karthick Raja Chandrasekar, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 13/042,918

(22) Filed: Mar. 8, 2011

(65) Prior Publication Data
US 2012/0230221 A1 Sep. 13, 2012

(51) Int. Cl.
*H04L 12/28* (2006.01)
*G06F 15/16* (2006.01)

(52) U.S. Cl.
USPC .......................................... 370/254; 709/209

(58) Field of Classification Search
None
See application file for complete search history.

(56) References Cited

U.S. PATENT DOCUMENTS

| | | | | |
|---|---|---|---|---|
| 8,396,497 | B2 * | 3/2013 | Nakajima ...................... | 455/507 |
| 2006/0039341 | A1 | 2/2006 | Ptasinski et al. | |
| 2006/0233142 | A1 | 10/2006 | Iwamura | |
| 2008/0037444 | A1 * | 2/2008 | Chhabra ...................... | 370/254 |
| 2008/0172491 | A1 * | 7/2008 | Chhabra et al. ............... | 709/227 |
| 2009/0222659 | A1 * | 9/2009 | Miyabayashi et al. ........ | 713/156 |
| 2010/0165875 | A1 * | 7/2010 | Kneckt et al. .................. | 370/254 |
| 2010/0167643 | A1 | 7/2010 | Hirsch | |
| 2010/0272083 | A1 | 10/2010 | Itoh et al. | |
| 2010/0291954 | A1 * | 11/2010 | Nakajima ...................... | 455/507 |
| 2010/0322213 | A1 * | 12/2010 | Liu et al. ....................... | 370/338 |
| 2010/0332666 | A1 | 12/2010 | Hamachi | |
| 2011/0044208 | A1 * | 2/2011 | Yun et al. ....................... | 370/254 |
| 2011/0188658 | A1 * | 8/2011 | Sakai et al. .................... | 370/338 |
| 2011/0202643 | A1 * | 8/2011 | Goto ............................. | 709/221 |
| 2011/0205944 | A1 * | 8/2011 | Miyabayashi et al. ........ | 370/310 |
| 2012/0063327 | A1 * | 3/2012 | Sakai ............................ | 370/254 |
| 2012/0265887 | A1 * | 10/2012 | Goto ............................. | 709/228 |
| 2013/0033995 | A1 * | 2/2013 | Kraglund et al. ............. | 370/252 |

FOREIGN PATENT DOCUMENTS

| | | |
|---|---|---|
| EP | 1793531 A1 | 6/2007 |
| WO | WO2010024074 A1 | 3/2010 |
| WO | WO2010047084 A1 | 4/2010 |

OTHER PUBLICATIONS

International Search Report and Written Opinion—PCT/US2012/026773—ISA/EPO—Jun. 13, 2012.

* cited by examiner

*Primary Examiner* — Timothy J Weidner
(74) *Attorney, Agent, or Firm* — Bay Area Technology Law Group PC

(57) ABSTRACT

This disclosure involves methods and systems for implementing IBSS networks between peer client devices. Devices function as registrar or enrollee in the network depending upon whether they are in configured or unconfigured mode. The WPS-PBC configuration routine allows the unconfigured enrollee device to obtain the necessary network configuration profile from the configured registrar device upon a successful WPS handshake process. Once a device has received the network configuration protocol, its status is switched to configured, allowing it to function as a registrar for the network for the subsequent addition of new devices. When both devices are initially in an unconfigured state, one is chosen to act as registrar so that it can automatically generate the necessary network configuration profile and pass it along to the other device. Following this process, both devices are set to configured mode.

20 Claims, 3 Drawing Sheets

SYSTEMS AND METHODS FOR IMPLEMENTING AD HOC WIRELESS NETWORKING

FIELD OF THE PRESENT INVENTION

The present disclosure generally relates to ad hoc wireless networks and more particularly to systems and methods for simplifying the formation of such networks.

BACKGROUND OF THE INVENTION

As the number of devices having wireless communication capabilities increases, there is a growing demand for the formation of wireless networks between these devices, such as Wireless Fidelity (WiFi) networks. Further, to help ensure the security of the information transmitted over such networks, it is often desirable to provide an encryption scheme to protect the data. However, setting up or joining an encrypted network typically requires a relatively high level of sophistication from the users regarding the ability to properly configure the appropriate settings, encryption methods, passwords and identifiers Accordingly, it is beneficial to simplify the process of establishing secure wireless networks. For example, current 802.11 wireless LAN standards provide a protocol for providing infrastructure basic service set (BSS) or extended service set (ESS) networks called WiFi Protected Setup (WPS) that allows users to setup, configure and join encrypted networks in a streamlined manner. Details regarding the WPS can be found in the specification document "Wi-Fi Protected Setup Specification," Version 1.0 h, December 2006, available from the Wi-Fi Alliance, which is hereby incorporated by reference. Generally, establishing and joining a WPS network does not require the user to manually configure the encryption and network settings. Instead, much of the configuration process is automatically initiated and carried out by devices having the appropriate WPS certification.

Conventional WPS networks include a registrar, which is a device configured to control the network and authorize the addition of new devices, and one or more enrollees, which are devices that are in the process of being authorized to join the network. In one implementation, the user of an enrollee device enters a Personal Identification Number (PIN), which validates the enrollee and triggers the registrar to transmit the relevant configuration settings, including the network name (SSID) and encryption security key. Upon receipt of this information, the enrollee then applies the appropriate settings and can join the encrypted network.

A variety of WPS further simplifies the enrollment process. The Push Button Control (PBC) extension of the WPS protocol allows an enrollee to be added to the infrastructure network by pushing a physical or virtual button on both the registrar device and the enrollee device within a given time window, typically two minutes. As will be appreciated, this implementation avoids the necessity of entering any specific information, such as a PIN, and the attendant risk of errors due to mistyping or misreading. Other implementations of the WPS protocol include additional mechanisms for validating devices seeking enrollment, for example using Near-Field Communication (NFC) strategies.

Despite the simplicity offered by the WPS protocol, its application has been limited to infrastructure network configurations which necessarily require some type of distribution system, often in the form of a dedicated access point. Although applicable in many situations, an infrastructure network cannot accommodate ad hoc networks formed solely between client devices. This type of network configuration is known as an independent basic service set (IBSS) and includes only two or more devices, or stations (STA), that operate in a peer relationship. IBSS networks do not have a distribution system or any other dedicated device that regulates the network. Without recourse to a WPS protocol, IBSS networks have conventionally required substantial manual configuration in order to properly setup secure communications between the participating devices.

Accordingly, it would be beneficial to provide a WPS protocol to setup an IBSS network and to add new devices to such networks. Similarly, it would be beneficial to provide a system and method for providing the creation, configuration and, joining of an ad hoc network between peer devices requiring minimal user input. It would also be beneficial to provide systems and methods for IBSS networking that do not require modification of existing protocols. This invention provides these and other benefits.

SUMMARY OF THE INVENTION

In accordance with the above objects and those that will be mentioned and will become apparent below, this disclosure is directed to a method for wireless communication comprising the steps of activating a configuration routine on a first device to cause the first device to transmit an activation information element and to scan for transmissions having an activation information element, wherein the first device is in unconfigured mode, receiving a transmission from a second device with the first device, wherein the transmission includes an activation information element, exchanging information wirelessly between the first device and the second device to provide the first device with a network configuration profile, applying the network configuration profile to the first device to enable communication over an independent basic service set network with the second device, and setting the first device to a configured mode. As indicated, aspects of the method, such as the transmission of activation information elements, conform to WPS protocols. Preferably, the independent basic service set network employs WPA2 encryption. Also preferably, the step of activating a configuration routine on the first device comprises pushing a button.

In one aspect, the step of receiving a transmission from the second device comprises receiving a transmission including a configuration information element indicating the second device is in configured mode. Further, the step of transmitting a configuration information element with the first device preferably includes indicating whether the first device is in configured or unconfigured mode.

Additionally, this embodiment can include activating a configuration routine on the first device when the first device is in configured mode to cause the first device to transmit an activation information element, activating a configuration routine on a third device to cause the third device to transmit an activation information element and to scan for transmissions having an activation information element, wherein the third device is in unconfigured mode, receiving a transmission from the first device with the third device, wherein the transmission includes an activation information element, exchanging information wirelessly between the first device and the third device to provide the third device with the network configuration profile, and applying the network configuration profile to the third device to enable communication over an independent basic service set network with the first device and the second device. Additionally, this aspect can also include setting the third device in configured mode after applying the network configuration profile.

In yet another aspect, when the transmission received from the second device includes a configuration information element indicating the second device is in unconfigured mode, the method includes the steps of establishing the second device as registrar and the first device as enrollee, generating the network configuration profile on the second device, and setting the second device to a configured mode, before exchanging information wirelessly between the first device and the second device to provide the first device with the network configuration profile. In the noted embodiment, establishing the second device as registrar is preferably based on a comparison of the MAC address of the devices.

The disclosure is also directed to a system for wireless communication comprising a first device transmitting an activation information element and a second device transmitting an activation information element; wherein the first device is configured to receive a transmission having the activation information element from the second device, exchange information wirelessly with the second device to obtain a network configuration profile to allow communication with the second device over an independent basic service set network, and change status from unconfigured to configured. Preferably, the first device and the second device transmit activation information elements conforming to WPS protocols. Also preferably, the independent basic service set network employs WPA2 encryption and the first device and the second device are configured to exchange information conforming to extensible authentication protocols. In another aspect of the disclosure, the first device and second device are configured to transmit the activation information element for a set period of time after a user pushes a button. Further, the first device and the second device can be configured to transmit a configuration information element that indicates configured or unconfigured status.

In one embodiment, the system includes a third device, wherein the third device is configured to receive a transmission from the first device including an activation information element and a configuration information element and exchange information wirelessly with the second device to obtain a network configuration profile to allow communication with the second device over an independent basic service set network when the configuration information element of the first device indicates configured status. Preferably, the third device is configured to receive the transmission from the first device after a configuration routine on the third device is activated.

In another aspect of the system, the second device is configured to function as registrar when unconfigured and receiving a transmission from the first device including a activation information element and a configuration information element indicating the first device is unconfigured by generating the network configuration profile and transmitting a configuration information element indicating the second device is configured. In such embodiments, the second device can be configured to function as registrar based upon a comparison of a MAC address of the first device with a MAC address of the second device.

BRIEF DESCRIPTION OF THE DRAWINGS

Further features and advantages will become apparent from the following and more particular description of the preferred embodiments of the invention, as illustrated in the accompanying drawing, and in which like referenced characters generally refer to the same parts or elements throughout the views, and in which.

DETAILED DESCRIPTION OF THE INVENTION

Figure 1:
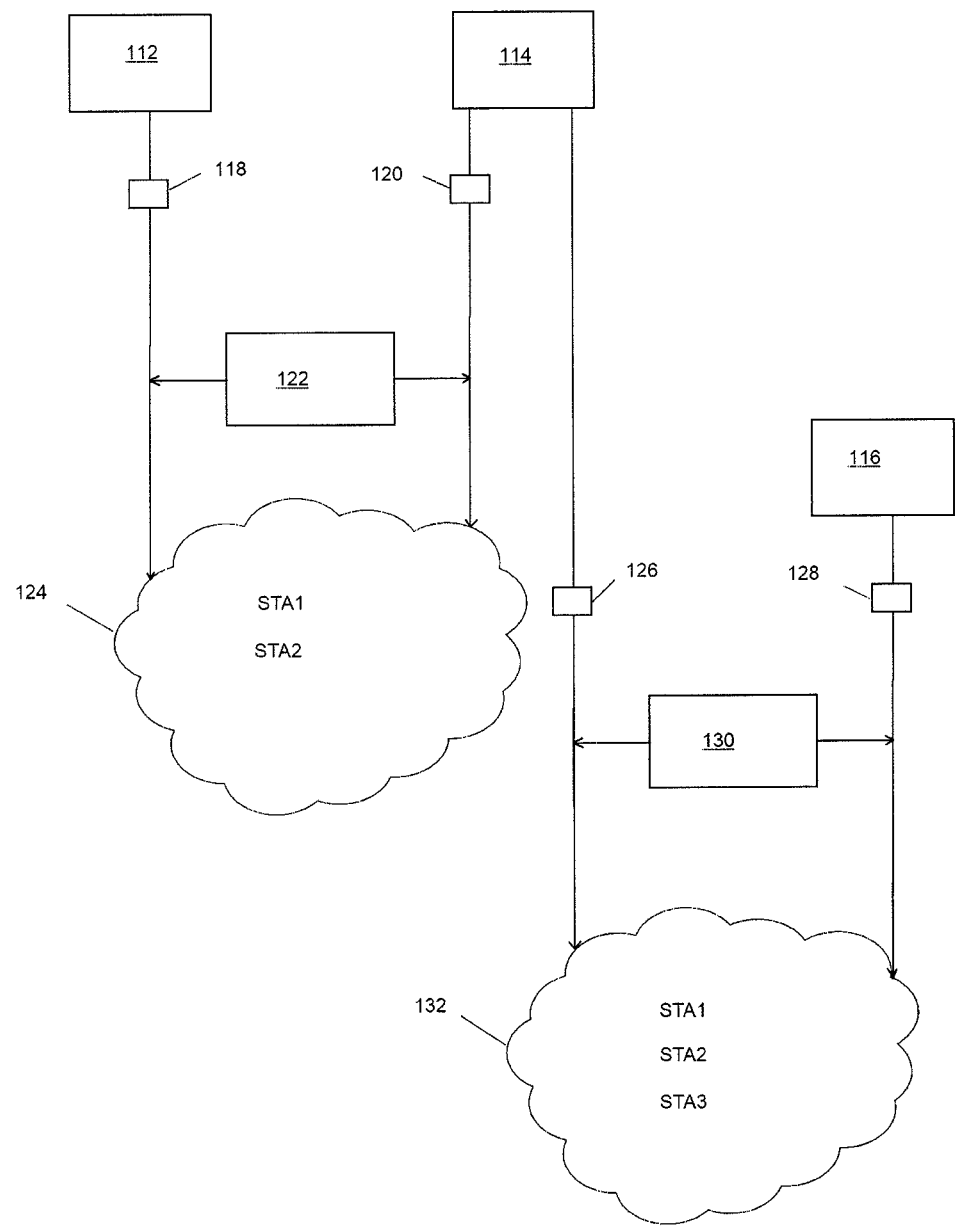
FIG. 1 is a schematic representation of an IBSS network including three stations, showing the addition of two devices to a network established by a first configured device, according to the invention.

At the outset, it is to be understood that this disclosure is not limited to particularly exemplified materials, methods or structures as such may, of course, vary. Thus, although a number of materials and methods similar or equivalent to those described herein can be used in the practice of embodiments of this disclosure, the preferred materials and methods are described herein.

It is also to be understood that the terminology used herein is for the purpose of describing particular embodiments of this disclosure only and is not intended to be limiting.

Unless defined otherwise, all technical and scientific terms used herein have the same meaning as commonly understood by one having ordinary skill in the art to which the disclosure pertains.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal.

In the figures, a single block may be described as performing a function or functions; however, in actual practice, the function or functions performed by that block may be performed in a single component or across multiple components, and/or may be performed using hardware, using software, or using a combination of hardware and software. Also, the exemplary transmission and receiving stations may include components other than those shown, including well-known components such as a processor and memory and perhaps audio and visual components.

Further, all publications, patents and patent applications cited herein, whether supra or infra, are hereby incorporated by reference in their entirety.

Finally, as used in this specification and the appended claims, the singular forms "a," "an" and "the" include plural referents unless the content clearly dictates otherwise.

As indicated above, this disclosure is directed to the creation and joining of IBSS networks using existing WPS protocols. WPS specifies that each compliant device periodically transmit a beacon indicating network status. Using the techniques of this disclosure, client devices signal their state as configured or unconfigured to dictate whether they function as registrar or enrollee in the network by including a configuration information element in the WPS beacon. Accordingly, when the configuration routine available though WPS-PBC is activated on each device, the unconfigured enrollee device obtains the necessary network configuration profile from the configured registrar device upon a successful WPS handshake process. Once a device has received the network configuration profile, its status is switched to configured, allowing it to function as a registrar for the network for the subsequent addition of new devices. When both devices are initially in an unconfigured state, one is chosen to act as registrar, such as by comparison of MAC addresses, so that it can automatically generate the necessary network configuration profile and pass it along to the other device. Following this process, both devices are set to configured mode. Specific details of these schemes are set forth in the scenarios depicted in the figures and as discussed below.

In a first implementation of the disclosure, FIG. 1 represents a scenario in which three devices, STA1 112, STA2 114 and STA3 16 communicate wirelessly by way of an IBSS network. Each device supports the WPS protocol in that both registrar and enrollee functions are enabled. Here, STA1 112 has already established an IBSS network and thus has been configured to act as a registrar. As such, STA1 already has certain configuration parameters such as SSID and encryption method, for example WPA2-PK and passphrase. Preferably, this profile is set automatically by following the conventional WPS methods. Alternatively, the configuration can be performed manually. Since STA1 112 is set to configured mode, it will act as registrar and a configuration information element (IE) for STA1 112 is set to indicate that it is in configured mode, such as WiFi Simple Configuration information element (WSC IE). Similarly, STA2 114 and STA3 116, which seek to join the network, start with configuration IEs set to unconfigured mode. This configuration IE is included in the WPS beacon transmissions of the devices so as to communicate the status of the devices to members and potential members of the network.

As indicated by block 118, the user of STA1 112 activates its PBC routine by pressing a physical (hard) button or a virtual (soft) button implemented in software, or through other suitable mechanisms. At this point, the WPS protocol allows STA1 112 to include in its beacon an activation IE, such as PBC IE, indicating its role as registrar for the network. A device seeking to join the network then follows the WPS-PBC protocol by the user pressing a button on STA2 114, indicated by block 120, activating its PBC routine. Activation of the PBC function on STA2 114 similarly causes the inclusion of an activation IE in its beacon and initiates a search for WPS-PBC beacons in the vicinity. At this point, STA2 114 can receive the beacon from STA1 112 and respond. The PBC routine of each device is preferably set to time out after a set period to minimize the chance of unauthorized devices being able to join the network. In a preferred embodiment, the time out period is in the range of approximately 2 min.

As one of skill in the art will recognize, STA1 112 will now act as registrar and STA2 114 as enrollee following the conventional WPS protocol. This involves an exchange of information between STA1 112 and STA2 114 as indicated by block 122. Generally, the information exchanged includes a probe, an authentication routine and WPS and encryption handshaking. A successful exchange terminates with the transmission of the necessary configuration information and a confirmation of encryption. At this point, STA2 114 has joined the IBSS network, allowing encrypted communication between STA1 112 and STA2 114 as indicated by network cloud 124.

As will be recognized by one of skill in the art, block 122 preferably involves an initial probe request sent from the enrollee and a response from the registrar. At this point, WPS utilizes the Extensible Authentication Protocol (EAP), which includes a request from the registrar that is answered by an EAP over LAN (EAPOL)-START frame. Next, EAP-Response/Identify and EAP-Request frames are used to exchange WPS-defined messages, M1-M8. The WPS handshake routine includes the transfer of relevant configuration profile information is delivered to the enrollee, including SSID and encryption key, such as CCMP passphrase/PSK. Finally, a WPA2 handshake routine between registrar and enrollee confirms successful encryption.

In a preferred implementation of the disclosure, the IBSS networks utilize Wi-Fi Protected Access 2 (WPA2). This encryption scheme is backwards compatible with WPA and employs the EAP framework to allow centralized mutual authentication and dynamic key management. However, if desired, appropriate modifications can be made to allow other encryption methods such as Wired Equivalent Privacy (WEP) to be used.

The IE of STA2 114 is now set to configured mode, allowing STA2 114 to also act as registrar for the network. The role of STA2 114 as registrar is depicted with regard to STA3 116 joining the network as shown in FIG. 1. Upon STA2 114 being set to configured mode, both STA1 112 and STA2 114 have the capability to act as registrar for the network. In the scenario shown in FIG. 1, the user of STA2 114 activates the PBC function, by pressing a button as represented by block 126, causing STA2 114 to transmit a beacon having an IE indicating its status as configured and, thus, its availability as a WPS registrar for the network.

In a similar manner to the process described above, when the user of STA3 116 seeks to join the network, the user activates the PBC routine, as indicated by block 128, such as by pressing a hard or soft button. Prior to joining the network, the WPS status of STA3 116 is unconfigured. Once the PBC function is activated in block 128, STA3 116 scans for WPS-PBC devices and finds the beacon frame having the registrar IE from STA2 114. This initiates the exchange of information indicated by block 130, which includes the initial probe request and response, the EAP for the WPS handshakes. STA2 114 and STA3 116 now complete the WPA2 handshakes to allow STA3 116 to join the IBSS network and communicate with STA1 112 and STA2 114 as indicated by cloud 132.

Figure 2:
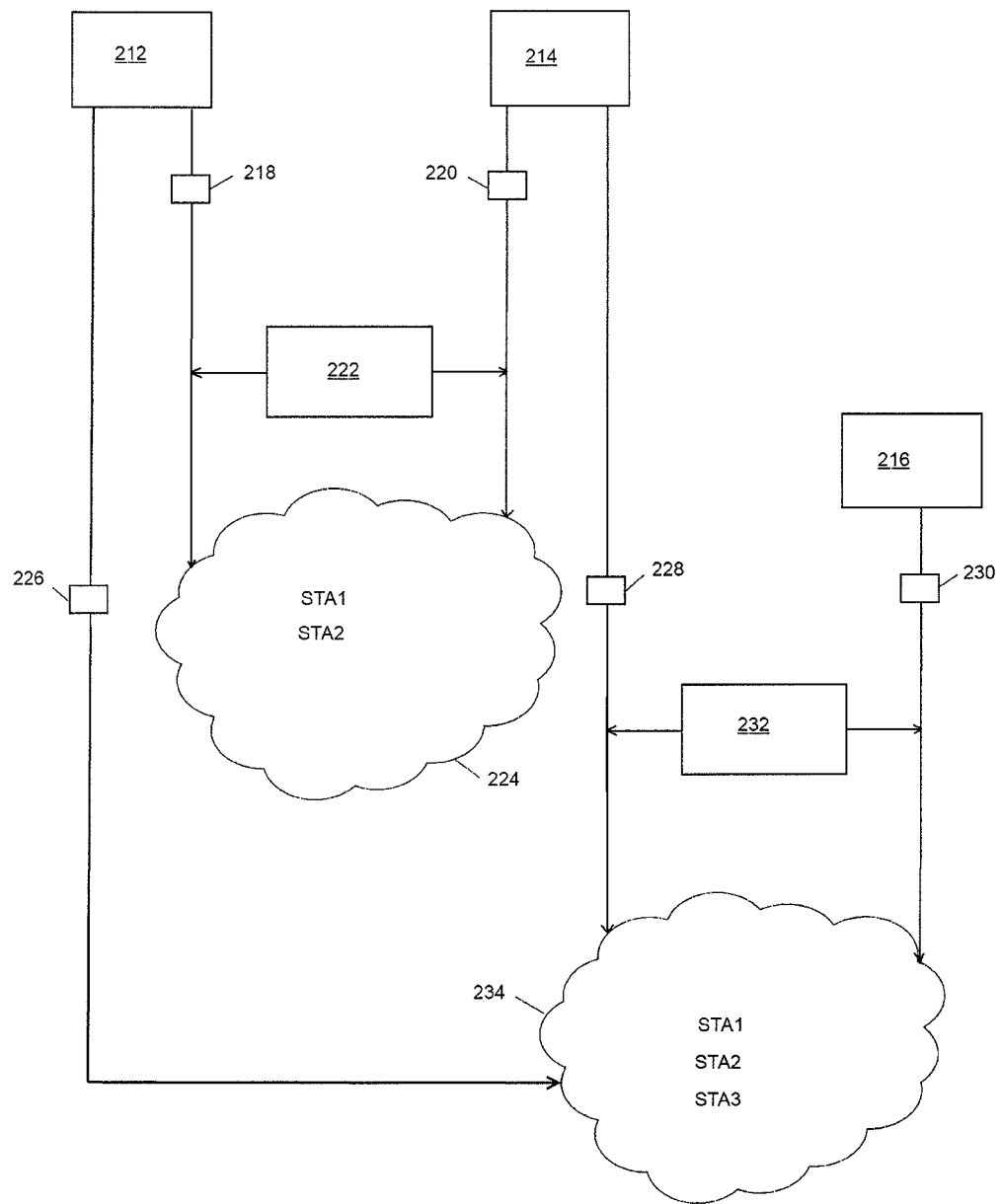
FIG. 2 is a schematic representation of an IBSS network including three stations, showing the addition of two devices to a network established by a first configured device when multiple PBC beacons are present, according to the invention.

Another implementation of the disclosure is shown in FIG. 2. In this scenario, three devices, STA1 212, STA2 214 and STA3 216 are shown joining an IBSS network. The process of STA2 214 joining is substantially the same as described above with regard to FIG. 1. Specifically, STA1 212 is in configured mode and acts as the registrar and STA2 214 is initially unconfigured, and therefore the enrollee. In block 218, the user of STA1 212 activates its PBC functionality by pressing a button, causing the inclusion of a PBC IE in its beacon allow configuration of an enrollee device. STA2 214 initiates the process of joining the network by pressing a button in block 220 so that STA2 214 will look for a WPS-PBC network to join. Since the scan will return the beacon information from STA1 212, STA2 214 can then automatically join the network as described above by transferring the necessary authentication and configuration information in block 222. STA2 214 joining the IBSS network is indicated by network cloud 224.

As before, an IE of STA2 214 is now set to configured mode, allowing STA2 214 to also act as registrar for the network. As depicted in FIG. 2, there are times that multiple WPS-PBC beacons will be in range of a device, such as STA3 216 seeking to join a network. In this scenario, the users of STA1 212 and STA2 214 have both activated the PBC function, as represented by blocks 226 and 228, causing both devices to broadcast beacons having IEs indicating being in configured mode and availability as WPS registrar.

Accordingly, when the user of STA3 216 seeks to join the network by activating the PBC function, as indicated by block 230, the scan returns beacon information from both STA1 212 and STA2 214. Although not shown, one of skill in the art will recognize that STA3 216 could also receive information corresponding to additional WPS-PBC networks in the vicinity. Therefore, the user of STA3 216 is presented with a list of the WPS-PBC networks found, allowing selection of the desired network, which in this embodiment is performed by selecting the beacon corresponding to STA2 214 as indicated by block 232. As a result, STA3 216 joins the IBSS network as indicated by cloud 234 and it is set to configured mode, so that it can be a registrar for the network. As will be appreciated, a similar result would have been achieved had the user of STA3 216 selected STA1 212 as the registrar.

Figure 3:
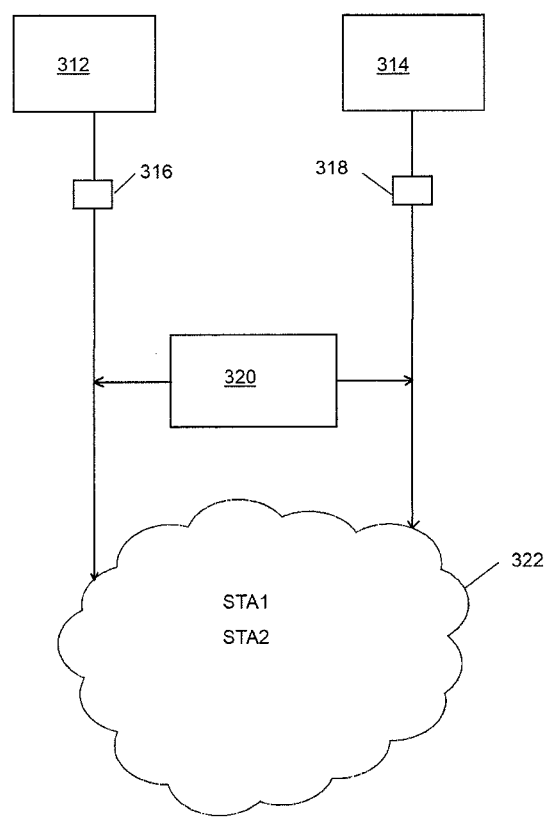
FIG. 3 is a schematic representation of an IBSS network including two stations, that is established when the two devices are initially unconfigured, according to the invention.

Yet another aspect of the disclosure is depicted in FIG. 3, in which two devices, STA1 312 and STA2 314 initiate an IBSS network. This scenario demonstrates the automatic configuration aspects of the WPS protocol. Initially, STA1 312 and STA2 314 have not joined a network. Accordingly, their beacon frame includes a configuration IE indicating they are in unconfigured mode. Next, the users of STA1 312 and STA2 314 initiate the formation of an IBSS network by activating the PBC functionality on their devices, such as by pushing hard or soft buttons as indicated by blocks 316 and 318, respectively. At this stage, STA1 312 and STA2 314 now transmit beacon frames with an activation IE.

Upon discovery of each other's beacons, STA1 312 and STA2 314 then exchange information in block 320 according to the WPS protocol as described above. Since both enter the information exchange in unconfigured mode, a suitable scheme for establishing which device is going to act as registrar and which as enrollee is implemented. In a preferred embodiment, the device having the higher MAC address is designated the registrar. As such, it preferably automatically generates the necessary configuration information for the IBSS network, including SSID, encryption method and passphrase. In the depicted embodiment, STA1 312 has the higher MAC address so it becomes the registrar, performs the network configuration and passes the configuration profile to enrollee, STA2 314. The result of this process is the formation of the IBSS network, allowing secured wireless communication between STA1 312 and STA2 314 as indicated by network cloud 322. Additionally, upon generating the configuration profile and receiving the profile, respectively, STA1 312 and STA2 314 are then set to configured mode, so that either can act as registrar for additional devices seeking to join the network.

Described herein are presently preferred embodiments, however, one skilled in the art that pertains to the present invention will understand that the principles of this disclosure can be extended easily with appropriate modifications to other applications.

What is claimed is:

1. A method for wireless communication comprising:
    activating a configuration routine on a first device to cause the first device to transmit a first frame having an activation information element and to scan for transmissions having an activation information element, wherein the first device is in unconfigured mode;
    receiving a transmission from a second device with the first device, wherein the received transmission has an activation information element;
    exchanging information wirelessly between the first device and the second device to provide the first device with a network configuration profile, negotiated between the first device and the second device;
    applying the network configuration profile to the first device to enable communication over an independent basic service set network with the second device; and
    setting the first device to a configured mode, wherein the first device and the second device are configured to function as registrars after exchanging the network configuration profile and communicate the network configuration profile to a third device in unconfigured mode.

2. The method of claim 1, wherein the transmission of the first frame having an activation information element conforms to WPS protocols.

3. The method of claim 2, wherein activating a configuration routine on the first device comprises pushing a button.

4. The method of claim 1, wherein the independent basic service set network employs WPA2 encryption.

5. The method of claim 1, wherein receiving a transmission from the second device comprises receiving a transmission including a configuration information element indicating the second device is in configured mode.

6. The method of claim 1, further comprising transmitting a configuration information element with the first device, wherein the configuration information element indicates whether the first device is in configured or unconfigured mode.

7. The method of claim 6, further comprising:
activating a configuration routine on the first device when the first device is in configured mode to cause the first device to transmit a second frame having an activation information element;
activating a configuration routine on the third device to cause the third device to transmit a frame having an activation information element and to scan for transmissions having an activation information element;
receiving a transmission from the first device with the third device, wherein the received transmission includes an activation information element;
exchanging information wirelessly between the first device and the third device to provide the third device with the network configuration profile; and
applying the network configuration profile with the third device to enable communication over the independent basic service set network with the first device and the second device.

8. The method of claim 7, further comprising setting the third device in configured mode after applying the network configuration profile.

9. The method of claim 1, wherein the transmission received from the second device includes a configuration information element indicating the second device is in unconfigured mode; further comprising:
establishing the second device as registrar and the first device as enrollee;
generating the network configuration profile on the second device;
setting the second device to a configured mode;
before exchanging information wirelessly between the first device and the second device to provide the first device with the network configuration profile.

10. The method of claim 9, wherein establishing the second device as registrar is based on a comparison of a MAC address of the first device to a MAC address of the second device.

11. A system for wireless communication comprising a first device transmitting a first frame having an activation information element; wherein the first device is configured to receive a transmission having an activation information element from a second device, exchange information wirelessly with the second device to negotiate a network configuration profile to allow communication with the second device over an independent basic service set network, and change status from unconfigured to configured, wherein the first device and the second device are configured to function as registrars after exchanging the network configuration profile and communicate the network configuration profile to a third device in unconfigured mode.

12. The system of claim 11, wherein the first device and the second device transmissions having an activation information element conform to WPS protocols.

13. The system of claim 12, wherein the first device is configured to transmit a plurality of frames having an activation information element for a set period of time after a user pushes a button.

14. The system of claim 11, wherein the independent basic service set network employs WPA2 encryption.

15. The system of claim 11, wherein the first device is configured to exchange information conforming to extensible authentication protocols.

16. The system of claim 11, wherein the first device is configured to transmit a frame having a configuration information element that indicates configured or unconfigured status.

17. The system of claim 11, further comprising the third device, wherein the third device is configured to receive a second frame transmitted by the first device including an activation information element and a configuration information element and exchange information wirelessly with the first device to obtain the network configuration profile to allow communication with the second device over the independent basic service set network when the configuration information element of the first device indicates configured status.

18. The system of claim 17, wherein the third device is configured to receive the second frame from the first device after a configuration routine on the third device is activated.

19. The system of claim 11, wherein the first device is configured to function as registrar when unconfigured and:
receive a transmission from the second device including an activation information element and a configuration information element indicating the second device is unconfigured;
generate the network configuration profile: and
transmit a frame having a configuration information element indicating the first device is configured.

20. The system of claim 19, wherein the first device is configured to function as registrar based upon a comparison of a MAC address of the first device with a MAC address of the second device.

* * * * *